(12) United States Patent
Jha et al.

(10) Patent No.: US 8,407,726 B2
(45) Date of Patent: Mar. 26, 2013

(54) COLLABORATION IN LOW BANDWIDTH APPLICATIONS

(75) Inventors: Sachin K Jha, Pune (IN); Sachin K Mahajan, Pune (IN); Tejas R Parajia, Pune (IN); Bharat B Purohit, Pune (IN); Rajan Raman, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 535 days.

(21) Appl. No.: 12/650,890

(22) Filed: Dec. 31, 2009

(65) Prior Publication Data

US 2011/0161984 A1 Jun. 30, 2011

(51) Int. Cl.
*G06F 3/00* (2006.01)
(52) U.S. Cl. ......................... 719/318; 715/751
(58) Field of Classification Search .................. 715/751; 719/318
See application file for complete search history.

(56) References Cited

U.S. PATENT DOCUMENTS

| | | | |
|---|---|---|---|
| 6,763,384 B1 | 7/2004 | Gupta et al. | |
| 7,401,294 B2 * | 7/2008 | Chang et al. | 715/733 |
| 7,552,190 B1 | 6/2009 | Freishtat et al. | |
| 7,581,221 B2 | 8/2009 | Lai et al. | |
| 7,587,609 B2 | 9/2009 | Arnone et al. | |
| 7,739,210 B2 * | 6/2010 | Horvitz et al. | 706/21 |
| 7,908,325 B1 * | 3/2011 | Pabla et al. | 709/205 |
| 2004/0243682 A1 | 12/2004 | Markki et al. | |
| 2005/0114458 A1 | 5/2005 | Gottlieb | |
| 2007/0168451 A1 | 7/2007 | Taylor et al. | |
| 2007/0239770 A1 * | 10/2007 | Enock et al. | 707/102 |
| 2008/0046510 A1 | 2/2008 | Beauchamp et al. | |
| 2008/0086431 A1 | 4/2008 | Robinson et al. | |
| 2008/0208969 A1 * | 8/2008 | Van Riel | 709/204 |
| 2009/0113452 A1 | 4/2009 | Grigsby et al. | |
| 2009/0172103 A1 | 7/2009 | Tuli | |
| 2011/0179157 A1 * | 7/2011 | Beers et al. | 709/223 |

OTHER PUBLICATIONS

URL:http://www.springerlink.com/content/j01qv2x43745ir72/.
URL:http://ieeexplore.ieee.org/xpl/freeabs_all.jsp?arnumber=951994.
URL:http://www2.computer.org/portal/web/csdl/doi/10.1109/IC-CIT.2007.304.

* cited by examiner

*Primary Examiner* — Charles E Anya
(74) *Attorney, Agent, or Firm* — DeLizio Gilliam, PLLC (57) ABSTRACT

For collaboration amongst applications, a first application is selected from the applications based on a pre-defined parameter of the first application and selecting a second application from the applications. At least one common collaboration element exists between the first application and the second application. A tag is added to the first application. The tag corresponds to an event notification corresponding to an event associated with the at least one common element.

17 Claims, 5 Drawing Sheets

Figure 5

COLLABORATION IN LOW BANDWIDTH APPLICATIONS

BACKGROUND

The Internet is a global system of interconnected computer networks that uses the standard Internet Protocol Suite (TCP/IP) to serve billions of users worldwide, with the ability to share information. Tools such as email and instant messaging allow users to interact and communicate with each other with relative ease. In fact, much of the communication and interaction that occurs on the Internet is peer-to-peer interaction. The Internet or online presence of businesses, entertainment companies and many other entities, however, is expanding and there is more than just the simple messaging type of communication that can occur on the internet.

Instant messaging (IM) systems are a popular communications mechanism for many users and provide for instant, real-time communication between users who are connected to the IM system through an on-line or electronic networking environment such as the Internet, the World Wide Web (hereinafter referred to as "the Web"), or corporate intranets. Although IM is an important application of a collaborative environment, there may be one or more other applications, such as, for example, email, that is also an element in the collaboration. In fact there may be multiple applications in the collaborative environment depending on the type of the business or collaboration need.

SUMMARY

Embodiments of the invention are directed to a method, a system and a computer program of collaborating amongst applications. Accordingly, embodiments of the invention disclose selecting a first application from the communicatively coupled applications based on a pre-defined parameter of the first application, selecting a second application from the communicatively coupled applications, wherein at least one common collaboration element exists between the first application and the second application, and adding a tag to the first application, wherein the tag corresponds to an event notification corresponding to an event associated with the at least one common element. According to a further embodiment the pre-defined parameter of the first application includes a bandwidth and the event notification includes at least a message or a status corresponding to the event at the second application.

A further embodiment of the invention discloses checking occurrence of the event generating the event notification corresponding to the event, in response to checking the occurrence, and transmitting the event notification. Yet a further embodiment of the invention discloses receiving, at the first application, the event notification transmitted by the second application, and displaying the event notification at the first application. A further embodiment of the invention discloses providing a link on the displayed event notification, and opening at least one of the message or the status corresponding to the event at the second application responsive to activation of the link. Other embodiments are also disclosed.

BRIEF DESCRIPTION OF THE DRAWINGS

Embodiments of the invention are described in detail below, by way of example only, with reference to the following schematic drawings, where.

DETAILED DESCRIPTION

Embodiments of the invention are directed to a method, a system and a computer program of collaboration amongst applications.

Figure 1:
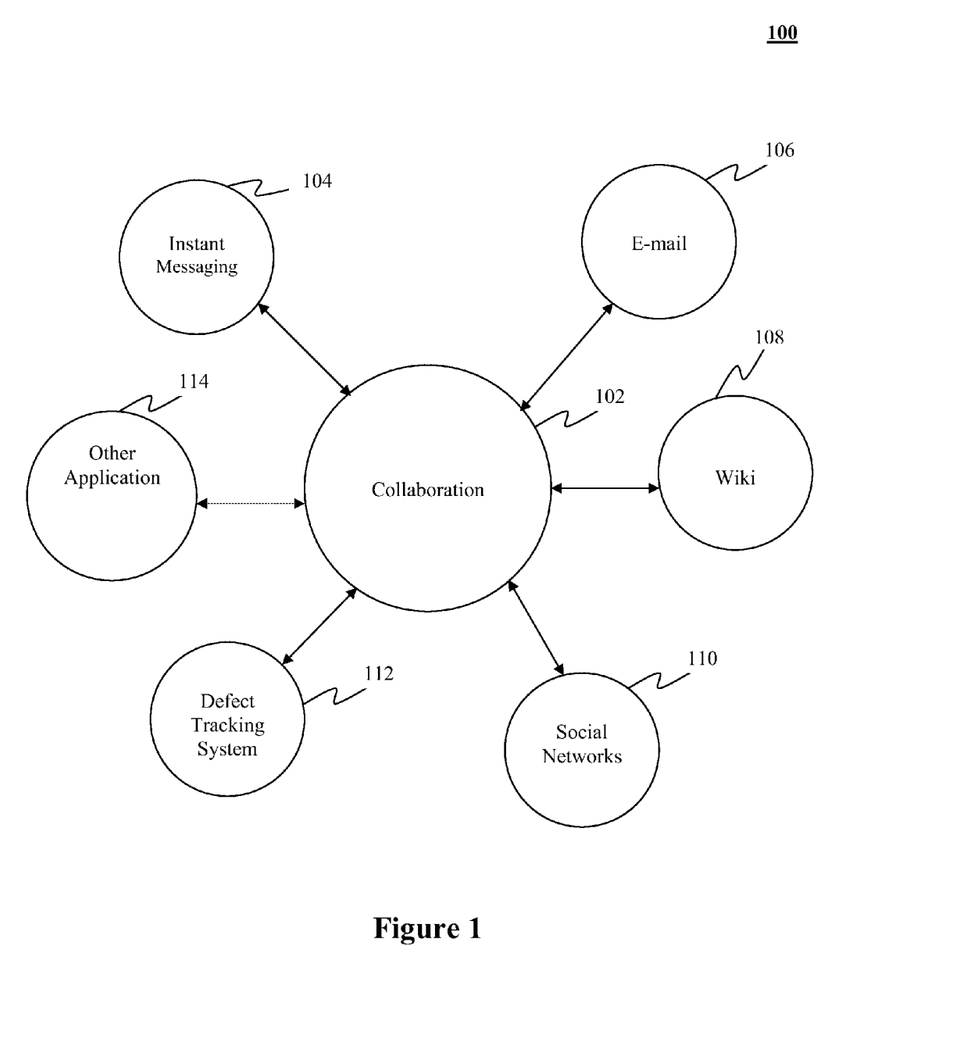
FIG. 1 shows a schematic of multiple applications communicatively coupled in a collaborative environment according to one or more embodiments of the present invention.

FIG. 1 shows a schematic 100 of multiple applications communicatively coupled in a collaborative environment according to one or more embodiments of the present invention. FIG. 1 depicts a collaboration platform 102, for example a network such as the Internet, which provides channels for, and enables collaboration between, multiple applications, either or both of which may include elements of invention embodiments. Multiple collaboration applications are depicted as an Instant Messaging (IM) application 104, an email application 106, a Wiki application 108, a social network application 110, a defect tracking system application 112 and another application 114 which may be coupled to the collaboration platform 102, and may be specific to a particular collaboration platform 102. While a single instance of each of applications (104-114) has been depicted, it will be appreciated that collaboration may be conducted between additional instances of each of the corresponding applications. For example, a collaborative session may be conducted between multiple instances of IM application 104 which may be extended to collaboratively communicate with other applications shown in FIG. 1 such as email application 106.

In collaboration activities of collaboration platform 102, collaborative events and actions may be managed using contextual analysis. There may be a member of IM application 104 that is also a member of email application 106. A "member" may include a user having an account or user identifier associated with a particular application. Embodiments of the present invention may enable a user of collaboration platform 102 to begin a chat connection using IM application 104 (or IM application functionality of an integrated application) with another user from whom an urgent mail is expected via email application 106 (or email application functionality from such an integrated application). A conventional method of utilizing a traditional collaboration platform in this context would entail opening an email application, checking if the expected mail has arrived (e.g., by replicating or otherwise requesting email delivery) and, depending on the presence or absence of the expected mail, continuing with the chat via an IM application. Opening a separate email application and polling for or accessing new email messages can be a time consuming task depending on multiple factors, such as available communication bandwidth. Multiple applications in collaboration platform 102 may also have different resource requirements. In the set of applications depicted in association with collaboration platform 102 of FIG. 1 for example, IM application 104 requires a comparatively lesser amount of resources for it to function successfully compared to email application 106 or defect tracking system application 112, in addition to typically operating at a comparatively lower bandwidth.

Figure 2:
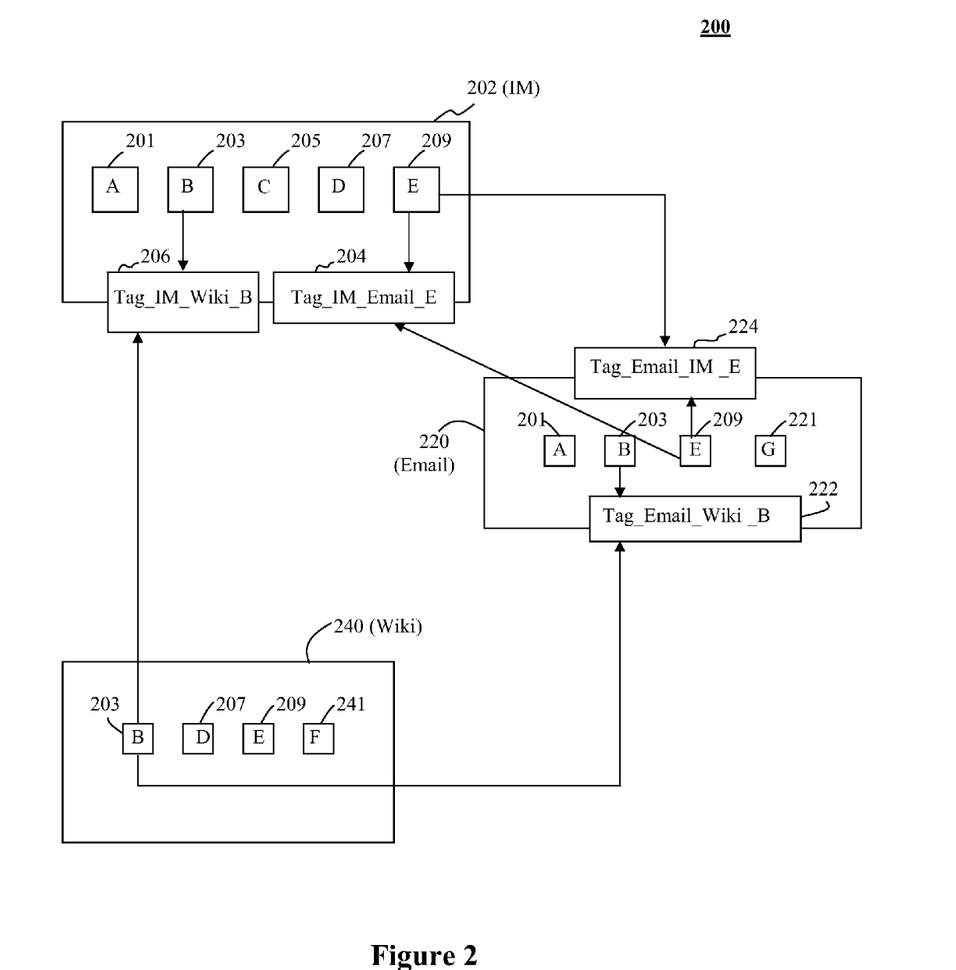
FIG. 2 shows a schematic of a mechanism of collaboration amongst communicatively coupled applications according to an embodiment of the invention.

FIG. 2 shows a schematic of a mechanism 200 of collaboration amongst communicatively coupled applications according to an embodiment of the invention. Mechanism 200 may be implemented as a computer or other data handling system including at least one processor and at least one memory. Mechanism 200 of the illustrated embodiment includes three example collaboration applications. Application 202 is an Instant Messaging (IM) application, application 220 is an email application, and application 240 is a Wiki application. Example members of IM application 202 are A 201, B 203, C 205, D 207, and E 209. In the illustrated embodiment, member A 201 is a member of IM application 202 and collaborates via email application 220, but does not collaborate via Wiki application 240. Member B 203 collaborates using all three applications. Member C 205 does not collaborate with any applications and is a stand alone member of IM application 202. Member D 207 is a member of and collaborates via IM application 202 and Wiki application 240. Member E 209 is a member of IM application 202 as well as email application 220 and wiki application 240. FIG. 2 additionally depicts members F 241 and G 221. Member F 241 is a member of Wiki application 240 alone. Member G 221 is a member of email application 220 alone in the illustrated embodiment.

FIG. 2 also depicts four tags. A tag is a connection point and an event notification reference for a common element in two applications taking part in collaboration. An element in the described embodiment may include any contextual link between two applications to enable collaboration. For example, an element may include data identifying a user or alternatively may include a specific communication context, message, post, or record. Tag IM_wiki_B 206 of IM application 202 indicates a connection reference between IM application 202 and wiki application 240 with member B 203 of IM application 202 being a common element between the two applications. Tag IM_email_E 204, similarly indicates a tag at IM application 202 indicating collaboration with email application 220 over a common element member E 209 from IM application 202. Tag email_IM_E 224 is a tag at email application 220 and indicates a connection reference between email application 220 and IM application 202 over a common member E 209. Tag email_wiki_B 222 is a tag at email application 220 and indicates a connection reference between email application 220 and wiki application 240 over a common member B 203.

In one example mode of operation, the depicted tags are created via a drag and drop operation of connections on screen for common elements between applications. As an example, to create Tag IM_email_E 204 at IM application 202, a user may drag an email received from member E 209 in an "inbox" folder of email application 220 onto an icon identifying member E 209 in a "buddy chat list" of IM application 202 or an associated chat/IM context, member E 209 and/or the associated email message or thread being a common element. In the described embodiment, if the user is using IM application 202, and an email arrives from E 209 in the "inbox" of email application 220 of the user, Tag IM_email_E 204 can be configured to notify the user about the reception of the email from E 209, without opening email application 220.

Figure 3A:
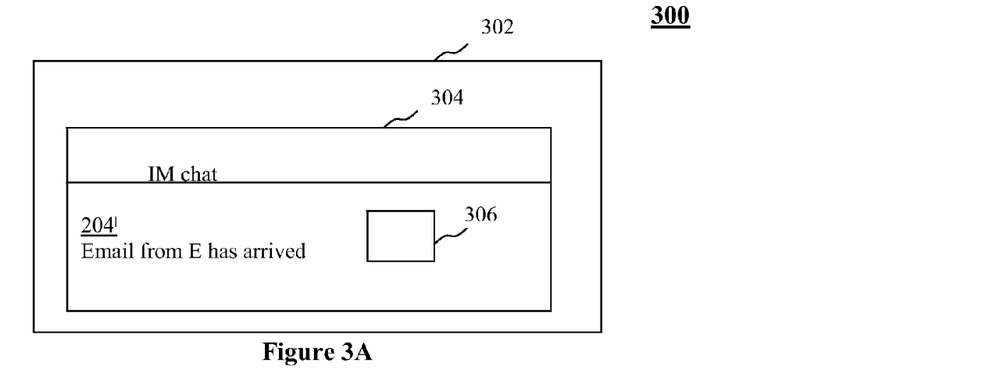
FIG. 3A, FIG. 3B and FIG. 3C show high-level schematics illustrating collaboration amongst communicatively coupled applications according to an example embodiment of the invention.
Figure 3B:
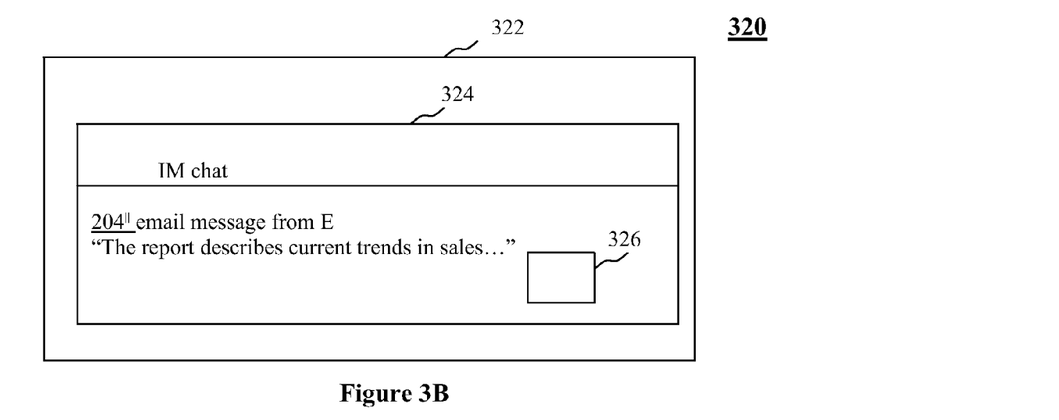

FIG. 3A, FIG. 3B and FIG. 3B show high-level schematics illustrating collaboration amongst communicatively coupled applications according to one or more embodiments of the present invention. FIG. 3A, FIG. 3B and FIG. 3B show example user interfaces at IM application 202 of FIG. 2.

FIG. 3A shows a schematic 300 illustrating an example user interface 302 of IM application 202. Within user interface 302, is a chat window 304 for the user, which is part of the IM application 202. While the user communicates with some other user over the IM application 202, if an email is received by the user from member E 209, at email application 220 of FIG. 2, then the corresponding Tag IM_email_E 204 of FIG. 2 creates an element 204' which is depicted in the chat window 304 showing status of the email arrival. The status shown by element 204' reads "email from E has arrived". In the illustrated mode, element 306 is a corresponding link to element 204' that enables the user to open a status or a message in email application 220.

FIG. 3B shows a schematic 320 illustrating an alternative user interface 322 of IM application. Within user interface 322, is a chat window 324 for the user of IM application 202 of FIG. 2. While communication between the user is taking place with some other user, if an email is received by the user from member E 209, at email application 220, then corresponding Tag IM_email_E 204 creates an element 204" which is depicted in chat window 324 as a status and subject or/and partial message of the received email. The subject and/or partial message shown by element 204" reads "email from E—The report describes current trends in sales". In the depicted embodiment, element 326 is a corresponding link to element 204" that enables the user to open a status or a message in email application 220.

Figure 3C:
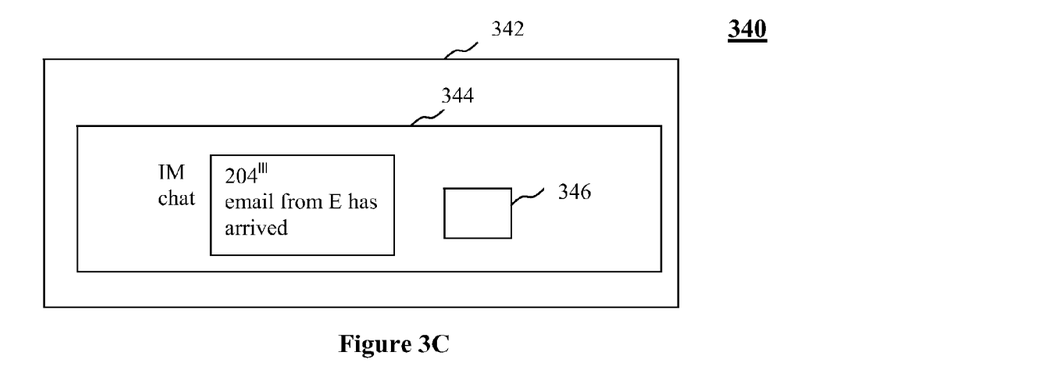

FIG. 3C shows a schematic 340 illustrating yet another alternative user interface 342 of IM application 202. Within user interface 342, is a chat window 344 for the user of IM application 202. While communication between the user is taking place with some other user, if an email is received by the user from member E 209, at email application 220 of FIG. 2, which is in collaboration with IM application 202, then Tag IM_email_E 204 creates an element 204''' which is depicted as another independent window in chat window 344 showing a status of email arrival. The status shown by element 204''' reads "email from E has arrived". In an exemplary mode, element 346 is a corresponding link to element 204''' that enables opening of a status or a message in email application 220.

Figure 4:
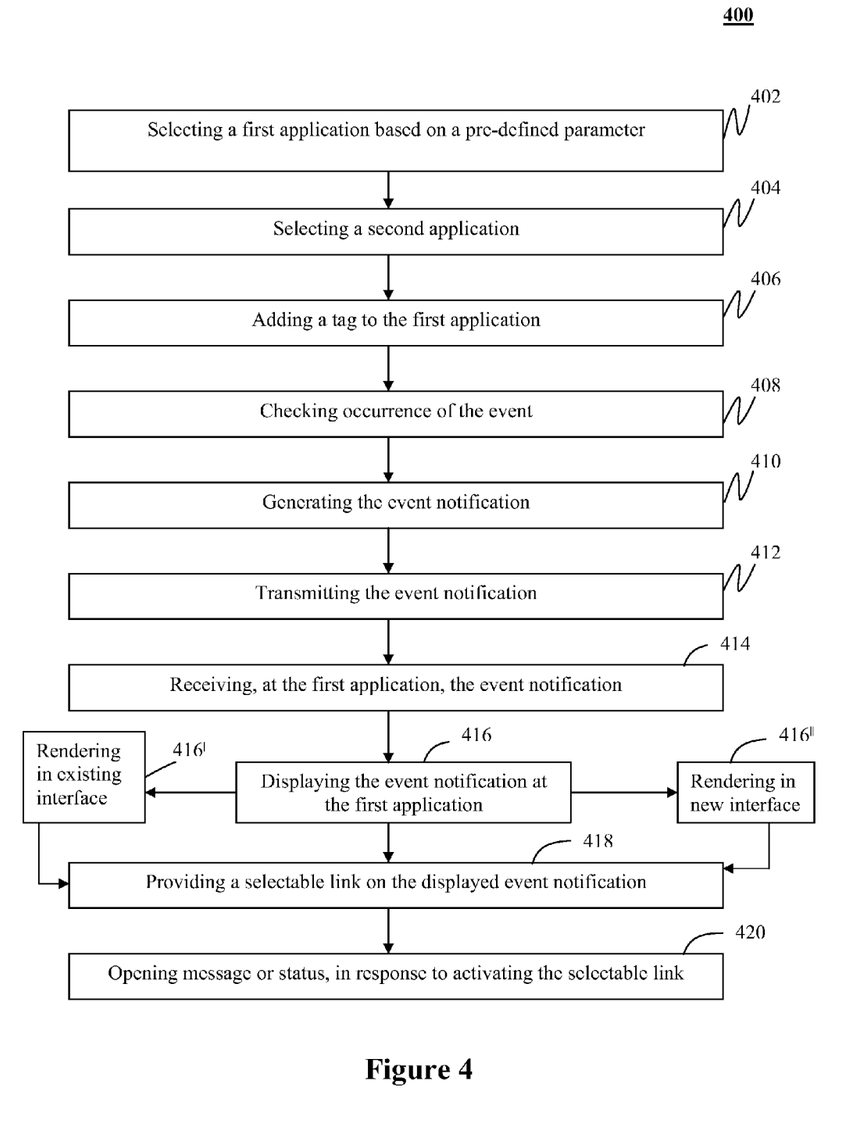
FIG. 4 shows a flow chart for collaboration amongst communicatively coupled applications as disclosed in one embodiment of the invention.

FIG. 4 shows a flow chart of a method 400 for collaboration amongst communicatively coupled applications as disclosed in one embodiment of the invention. Step 402 depicts selecting a first application from the communicatively coupled applications based on a pre-defined parameter of the first application. In step 404 a second application is selected from the communicatively coupled applications, and at least one common collaboration element exists between the first application and the second application. In step 406 a tag is added to the first application, the tag corresponds to an event notification corresponding to an event associated with the at least one common element. In one embodiment, the pre-defined parameter of the first application may be bandwidth. The event notification may be a message or a status corresponding to an occurrence of the event at the second application.

In step 408 occurrence of the event is detected. Step 408 indicates detection of the occurrence of the event is performed by an application selected from a set of the first application and the second application. In one embodiment checking is performed either in response to a user input or at a pre-determined interval. In step 410 the event notification corresponding to the event is generated, in response to a detection of the occurrence of the event in step 408. In step 412 the event notification is transmitted from the second application to the first application. In step 414, the first application receives the event notification sent by the second application. In step 416 the event notification is displayed at the first application. In the illustrated embodiment mode, preferences of a user of the first application may control the displaying of the event notification. Step 418 depicts providing a link on the displayed event notification, and step 420 depicts opening at least one of a corresponding element (e.g., a electronic mail message) or the status corresponding to the event at the second application responsive to activation of the link.

Step 416 of FIG. 4 as illustrated and described herein may further include either step 416' of rendering the received event notification by the first application in an existing interface of the first application or a step 416" of rendering the received event notification by the first application in a new interface of the first application.

Figure 5:
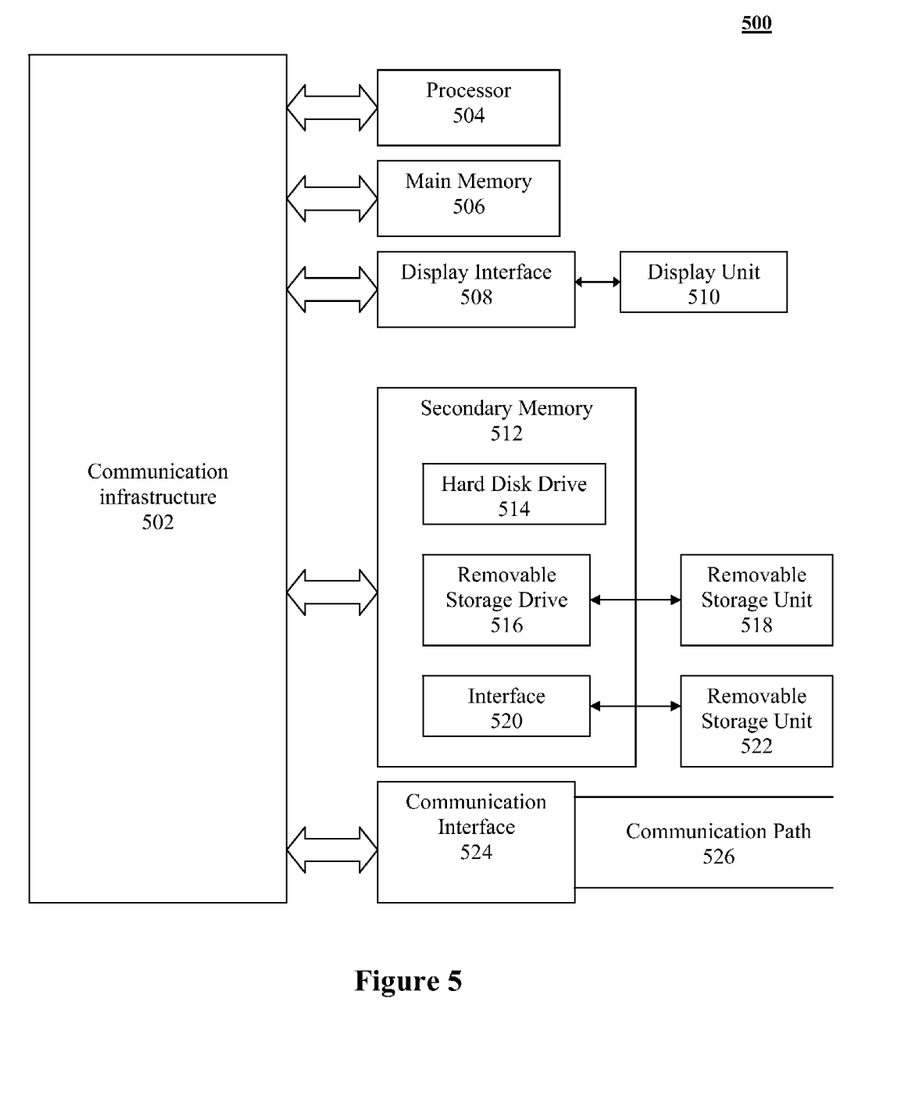
FIG. 5 shows a detailed schematic of a computer system used for collaboration amongst communicatively coupled applications as disclosed in FIG. 2.

FIG. 5 is a block diagram of an example computer system 500 that can be used for implementing various embodiments of the invention. In some embodiments, the computer system 500 can be used as a system executing schematic of any one or more from FIG. 2, FIG. 3A, FIG. 3B or FIG. 3C. The computer system 500 can also be used to perform the steps described in FIG. 4. The computer system 500 includes at least a processor 504. It should be understood although FIG. 5 illustrates a single processor, one skilled in the art would appreciate that more than one processor can be included in alternative embodiments of the present invention. Processor 504 is connected to a communication infrastructure 502 (for example, a communications bus, cross-over bar, or network) where communication infrastructure 504 is configured to facilitate communication between various elements of computer system 500. Various software embodiments are described in terms of this example computer system. After reading this description, it will become apparent to a person of ordinary skill in the relevant art(s) how to implement embodiments of the invention using other computer systems and/or computer architectures.

Computer system 500 can include a display interface 508 configured to forward graphics, text, and other data from communication infrastructure 502 (or from a frame buffer not shown) for display on a display unit 510. Computer system 500 also includes a main memory 506, which can be random access memory (RAM), and may also include a secondary memory 512. The secondary memory 512 may include, for example, a hard disk drive 514 and/or a removable storage drive 516, representing a floppy disk drive, a magnetic tape drive, an optical disk drive, etc. Removable storage drive 516 reads from and/or writes to a removable storage unit 518. Removable storage unit 518, represents in various embodiments of the present invention, for example, a floppy disk, magnetic tape, optical disk, etc. which is read by and written to by removable storage drive 516. As will be appreciated, removable storage unit 518 includes a computer usable storage medium having stored therein computer software and/or data.

In various embodiments, secondary memory 512 may include other similar means for allowing computer programs or other instructions to be loaded into the computer system. Such means may include, for example, a removable storage unit 522 and an interface 520. Examples of such may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface 524. Communications interface 524 allows software and data to be transferred between the computer system and external devices. Examples of communications interface 524 may include a modem, a network interface (such as an Ethernet card), a communications port, a PCMCIA slot and card, etc. Software and data transferred via communications interface 524 are in the form of signals which may be, for example, electronic, electromagnetic, optical, or other signals capable of being received by communications interface 524. These signals are provided to communications interface 524 via a communications path (that is, channel) 526. Channel 526 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 506 and secondary memory 512, media associated with removable storage drive 516, media installed in hard disk drive 514, and signals. These computer program products are means for providing software to the computer system. The computer readable medium allows the computer system to read data, instructions, messages or message packets, and other computer readable information from the computer readable medium. The computer readable medium, for example, may further include non-volatile memory, such as Floppy, ROM, Flash memory, Disk drive memory, CD-ROM, and other permanent storage. It can be used, for example, to transport information, such as data and computer instructions, between computer systems. Furthermore, the computer readable medium may comprise computer readable information in a transitory state medium such as a network link and/or a network interface, including a wired network or a wireless network, that allows a computer to read such computer readable information.

Computer programs (also referred to herein as computer control logic) are stored in main memory 506 and/or secondary memory 512. Computer programs may also be received via communications interface 524. Such computer programs, when executed, can enable the computer system to perform the features of one or more example embodiments of the present invention as discussed herein. In particular, the computer programs, when executed, enable processor 504 to perform the features of computer system 500. Accordingly, such computer programs represent controllers of the computer system.

Embodiments of the invention further provide a storage medium tangibly embodying a program of machine-readable instructions executable by a digital processing apparatus to carry out a method of collaboration amongst applications as described in the various embodiments set forth above and described in detail.

Advantages of various embodiments of the invention include potential reduction of overheads switching back and forth between multiple applications especially in a bandwidth challenged environment. Advantages of various embodiments of the invention include near-real-time updates in a single application window for multiple applications requiring otherwise bulky resources.

The described techniques may be implemented as a method, apparatus or article of manufacture involving software, firmware, micro-code, hardware such as logic, memory and/or any combination thereof. The term "article of manufacture" as used herein refers to code or logic and memory implemented in a medium, where such medium may include hardware logic and memory [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also include transmission signals propagating through space or a transmission media, such as an optical fiber, copper wire, etc. The transmission signal in which the code or logic is encoded may further include a wireless signal, satellite transmission, radio waves, infrared signals, Bluetooth, the internet etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may include a combination of hardware and software components in which the code is embodied, processed, and executed. Of course, those skilled in the art will recognize that many modifications may be made without departing from the scope of embodiments, and that the article of manufacture may include any information bearing medium having stored therein instructions that when executed by a machine results in operations being performed.

Certain embodiments can take the form of an entirely hardware embodiment, an entirely software embodiment or an embodiment containing both hardware and software elements. In one instance an embodiment of the invention is implemented in software, which includes but is not limited to firmware, resident software, microcode, etc.

Elements that are in communication with each other need not be in continuous communication with each other, unless expressly specified otherwise. In addition, elements that are in communication with each other may communicate directly or indirectly through one or more intermediaries. Additionally, a description of an embodiment with several components in communication with each other does not imply that all such components are required. On the contrary, a variety of optional components may be used in alternative possible embodiments.

Further, although process steps, method steps or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently. Further, some or all steps may be performed in run-time mode.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

Although example embodiments of the invention have been described in detail, it should be understood that various changes, substitutions and alternations could be made thereto without departing from spirit and scope of the inventions as defined by the appended claims. Variations described for embodiments of the present invention can be realized in any combination desirable for each particular application. Thus particular limitations, and/or embodiment enhancements described herein, which may have particular advantages to a particular application, need not be used for all applications. Also, not all limitations need be implemented in methods, systems, and/or apparatuses including one or more concepts described with relation to embodiments of the invention.

What is claimed is:

1. A method for enabling collaboration amongst applications on a data handling system, the method comprising:
    selecting a first application from the applications on the data handling system based on a pre-defined parameter of the first application and an indication of a first user of a first plurality of users, wherein the first plurality of users comprises a second user associated with the data handling system, wherein the pre-defined parameter comprises a bandwidth associated with the first application;
    selecting a second application from the applications and indication of the first user, wherein the indication of the first user is associated with both the first application and the second application and a second plurality of users associated with the second application includes the first user and the second user, wherein the first application and the second application have different resource requirements as indicated by the pre-defined parameter at least one common application; and
    responsive to said selecting of the first application and the indication of the first user and said selecting the second application and the indication of the first user associating a tag with the first application and the indication of the first user and associating the tag with the second application and the indication of the first user, wherein the tag indicates a connection reference between the first application and the second application with respect to the user;
    detecting occurrence of an event, which corresponds to the first user, at the second application; and
    displaying an event notification for the event at the second application in an interface of the first application based on the tag associated with the first application, the second application, and the first user.

2. The method of claim 1, wherein the event notification comprises at least one of a message and a status corresponding to the event.

3. The method of claim 2, further comprising:
    generating the event notification in response to said detecting the occurrence of the event, which corresponds to the first user, at the second application; and
    transmitting the event notification from the second application to the first application.

4. The method of claim 3, wherein said detecting the occurrence of the event is performed by the second application.

5. The method of claim 3, wherein said detecting the occurrence of the event is performed at a pre-determined interval.

6. The method of claim 1, further comprising:
selecting of a third application of the applications on the data handling system and of an indication of the first user;
responsive to said selecting of the first application and the indication of the first user and said detecting of the third application and the indication of the first user, associating a second tar with the first application and the indication of the first user and associating the second tag with the third application and the indication of the first user; detecting occurrence of a second event, which corresponds to the first user, at the third application; receiving, and
displaying a second event notification in the interface of a4 the first application based on the second tag being associated with the first application, the third application, and the first user.

7. The method of claim 1, wherein said displaying the event notification in the interface of the first application comprises displaying the event notification utilizing display preferences of the second user associated with the first application.

8. The method of claim 1,
wherein said detecting the occurrence of the event, which corresponds to the first user, at the second application comprises detecting one of an e-mail communication from the first user to the second user and a wiki edit by the first user.

9. The method of claim 8, wherein
said displaying the event notification in the interface of the first application comprises displaying a link to the e-mail communication or the wiki edit without switching to the second application.

10. A computer program product for enabling collaboration amongst applications on a data handling system, the computer program product comprising:
a computer readable storage medium having computer readable program code embodied therewith, the computer readable program code comprising:
computer readable program code configured to select a first application from the applications based on a pre-defined parameter of the first application and an indication of a first user of a first plurality of users, wherein the first plurality of users comprises a second user associated with the data handling system, wherein the pre-defined parameter comprises a bandwidth associated with the first application;
select a second application from the applications and indication of the first user, wherein the indication of the first user is associated with both the first application and the second application and a second plurality of users associated with the second application includes the first user and the second user, wherein the first application and the second application have different resource requirements as represented by the pre-defined parameter;
responsive to the selection of the first application and the indication of the first user and selection of the second application and the indication of the first user, associate a tag with the first application and the indication of the first user and associating the tag with the second application and the indication of the first user, wherein the tag indicates a connection reference between the first application and the second application with respect to the user;
detect occurrence of an event, which corresponds to the first user, at the second application; and
display an event notification for an event at the second application in an interface of associated with the first application based on the tag being associated with the first application, and the second application, and the first user.

11. The computer program product of claim 10, wherein the event notification comprises at least one of a message and a status corresponding to the event, the computer readable program code configured to generate the event notification in response to a detection of the occurrence of the event at the second application; and
transmit the event notification from the second application to the first application.

12. The computer program product of claim 11, wherein the computer readable program code is further configured to the selection of a third application of the applications on the data handling system and of an indication of the first user;
responsive to the selection of the first application and the indication of the first user and the third application and the indication of the first user, associate a second tag with the first application and the indication of the first user and associate the second tar with the third application and the indication of the first user; and
detect occurrence of a second event, which corresponds to the first user, at the third application receive, and display the second event notification in the interface of the first application based on the second tag being associated with the first application, the third application, and the first user.

13. The computer program product of claim 11, wherein the computer readable program code is further configured to
display a link corresponding to a display of the event notification in the interface of the first application;
wherein the link links to one of an e-mail communication from the first user to the second user and a wiki edit by the first user.

14. A data handling system comprising:
a processor;
a communication infrastructure coupled with the processor;
a display interface coupled with the communication infrastructure;
a display unit coupled with the display interface; and
a computer readable storage medium having computer readable program code embodied therewith, the computer readable program code comprising computer readable program code configured to:
select a first application from the applications based on a pre-defined parameter of the first application and an indication of a first user of a first plurality of users, wherein the first plurality of users comprises a second user associated with the data handling system, wherein the pre-defined parameter comprises a bandwidth associated with the first application;
select a second application from the applications and indication of the first user, wherein the indication of the first user is associated with both the first application and the second application and a second plurality of users associated with the second application includes the first user and the second user, wherein the first application and the second application have different resource requirements as represented by the pre-defined parameter;
responsive to selection of the first application and the indication of the first user and selection of the second application and the indication of the first user, associate a tag with the first application and the indication of the first user and associating the tag with the second application and the indication of the first user, wherein the tag indicates a connection reference between the first application and the second application with respect to the user; and detect occurrence of an event, which corresponds to the first user, at the second application; and display an event notification for the event at the second application in an interface of the first application based on the tag being associated with the first application, the second application, and the first user.

15. The data handling system of claim 14, wherein the event notification comprises at least one of a message and a status corresponding to the event, the computer readable program code further configured to generate the event notification in response to a detection of the occurrence of the event at the second application; and transmit the event notification from the second application to the first application.

16. The data handling system of claim 14, wherein the computer readable program code is further configured to the selection of a third application of the applications on the data handling system and of an indication of the first user;

responsive to the selection of the first application and the indication of the first user and the third application and the indication of the first user, associate a second tag with the first application and the indication of the first user and associate the second tag with the third application and the indication of the first user; and detect occurrence of a second event, which corresponds to the first user, at the third application; and display the second event notification in the interface of the first application based on the second tag being associated with the first application, the third application, and the first user.

17. The data handling system of claim 14, wherein the computer readable program code is further configured to display a link corresponding to a display of the event notification in the interface of the first application;

wherein the link links to one of an e-mail communication from the first user to the second user and a wiki edit by the first user.

* * * * *